Nov. 6, 1951     W. C. LANNING     2,573,795
HYDROCARBON SYNTHESIS PROCESS
Filed Aug. 16, 1948
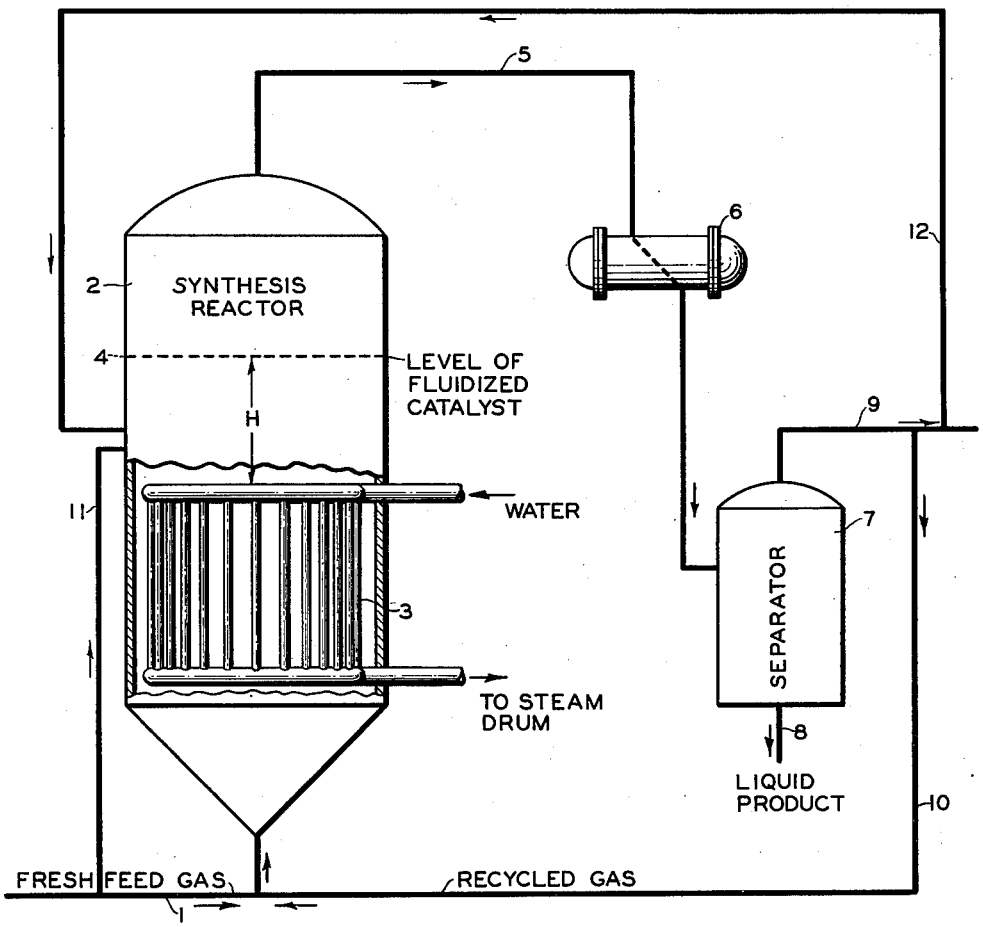
INVENTOR.
WILLIAM C. LANNING
BY *Hudson and Young*
ATTORNEYS Patented Nov. 6, 1951

2,573,795

UNITED STATES PATENT OFFICE 2,573,795

HYDROCARBON SYNTHESIS PROCESS

William C. Lanning, Bartlesville, Okla., assignor to Phillips Petroleum Company, a corporation of Delaware Application August 16, 1948, Serial No. 44,447

8 Claims. (Cl. 260—449.6)

This invention relates to a process for the synthesis of hydrocarbons and oxygenated organic compounds which is effected by passing a gaseous mixture of hydrogen and carbon monoxide through a fluidized bed of a suitable finely divided catalyst at catalyst-fluidizing velocities and at suitable reaction conditions. In one of its aspects this invention relates to the regeneration of fluidized hydrocarbon synthesis catalysts by contacting the catalyst with a hydrogen-containing gas at an elevated temperature in the synthesis reactor. This invention is useful for the continuous regeneration of a hydrocarbon synthesis catalyst in the synthesis reactor while simultaneously effecting the synthesis reaction.

In catalytic processes for the synthesis of hydrocarbons and other valuable organic compounds from gaseous mixtures containing carbon monoxide and hydrogen, it is often observed that the effectiveness of the catalyst decreases after a period of operation. This decrease may be indicated by lowered yields of desired products or by difficulty in the control of the reaction temperature. In many such cases it has been found beneficial to treat the catalyst at regular intervals at temperatures somewhat higher than the normal reaction temperatures with hydrogen or with gases rich in hydrogen. Although my invention is not to be restricted by consideration of any theory of the mechanism by which such rejuvenation of the catalyst takes place, it is usually considered that such treatment removes excess wax or similar low-volatility substances which accumulate on the catalyst during operation; other beneficial reactions may also occur during such treatments.

In the use of finely divided catalysts in the fluidized state for such processes, a portion of the catalyst is usually withdrawn from the synthesis reactor in a continuous stream and transferred to a separate chamber in which the desired regenerative treatment of the catalyst takes place. Regenerated catalyst is then transferred back to the main reactor. By such a scheme it is possible to maintain the catalyst in the main reactor at a high average level of activity, but extensive and complicated means are required for transferring the fluidized catalyst and for the necessary controls for such operation. For example, the catalyst in all transfer lines must be kept in fluidized condition in order to prevent bridging and stoppage of flow; also, the level of fluidized catalyst in both the main reactor and the regenerator must be controlled. It is also to be noted that the necessary severity and extent of the regenerative treatment may vary, depending upon the nature of the catalyst, the operating conditions or other factors.

It is an object of this invention to provide a novel method for regenerating hydrocarbon synthesis catalysts. Another object of this invention is to provide a novel method for regenerating hydrocarbon synthesis catalysts in the synthesis reactor. A further object of this invention is to provide a novel method for a hydrocarbon synthesis that is effected in such a manner that regenerative treatment of the catalyst is obtained within the synthesis reaction chamber simulaneously with the synthesis reaction. Additional objects will be apparent from the disclosure hereinafter.

I have found that a hydrocarbon synthesis reaction using a finely-divided, fluidized catalyst can be effected in such a manner that, simultaneously with the synthesis reaction, the catalyst is regenerated in the synthesis reactor.

The attached diagrammatic drawing is useful for a complete understanding of my invention. Such conventional equipment as pumps, compressors, valves, etc. have not been included in this drawing in order to facilitate the explanation and understanding of my invention.

Hydrocarbon synthesis reactions may be effected in the presence of various catalysts such as iron, cobalt, nickel, and ruthenium either with or without metallic oxides, such as oxides of aluminum, beryllium, calcium, etc., as promoting and supporting materials. The conditions at which the reactions are effected are dependent upon the catalyst that is used. I prefer to use a reduced iron catalyst promoted with such known promoting materials as oxides of aluminum, potassium and calcium, and my invention will be so described hereinbelow, but it will be readily apparent that any hydrocarbon synthesis catalyst that can be regenerated by contacting with a hydrogen-containing gas can be used in the practice of my invention.

It is well known that the reaction of carbon monoxide and hydrogen to produce hydrocarbons and oxygenated products of varying molecular weight and containing a varying number of carbon atoms per molecule is highly exothermic and that, in order to maintain the reaction temperature within the desired limits, it is necessary to remove the excess exothermic heat from the reaction zone. To do so it is quite conventional to provide the reaction chamber with a series of coils through which is circulated a liquid coolant, such as water or other suitable coolant to absorb the excess exothermic heat. I will describe my invention with the use of such cooling coils, but it is not limited to this method of cooling. Other known methods of heat removal, such as placing a water jacket around at least a portion of the reaction chamber, are readily adaptable for use in my process.

In accordance with my invention hydrocarbons and oxygenated derivatives thereof are produced by passing a mixture of hydrogen and carbon monoxide through a fluidized bed of a catalyst for the reaction. The temperature in the lower portion of the fluidized catalyst bed is maintained within the desired limits for the reaction, but the temperature in the upper portion of the catalyst bed is permitted to increase above the desired reaction temperature and to a temperature suitable for the hydrogen-regeneration of the catalyst. The gas in the upper portion of the catalyst bed is hydrogen-rich, and, as a consequence, regeneration of the catalyst is effected in the upper portion of the catalyst bed simultaneously with the synthesis reaction in the lower portion of the catalyst bed.

Referring to the diagrammatic drawing, a typical hydrocarbon synthesis reaction system is shown. Fresh synthesis feed gas, containing hydrogen and carbon monoxide in the ratio of 1:1 to 3:1, preferably 1.8:1 to 2.2:1, and more preferably 2:1, enters the system via line 1 and, along with recycled gas (to be described below) enters the synthesis reactor 2 at a point at or near the bottom of the reactor. Reactor 2 contains a finely divided caatlyst of reduced iron oxide promoted with minor proportions of oxides of aluminum, potassium and calcium. The pressure in the reactor is ordinarily superatmospheric, and the gases entering the reactor enter at a velocity, within the range of 0.5 to 5.5 feet per second, sufficient to maintain the finely divided catalyst in a fluidized state or in constant agitation and turbulence. Reactor 2 is provided with cooling tubes 3 through which water is circulated, passing subsequently to a steam drum as indicated, for the removal of the excess exothermic heat of reaction. By proper adjustment of the velocity of the gases entering reactor 2 I maintain the level of the fluidized catalyst bed (shown as 4 on the drawing) at a point within reactor 2 above the upper level of cooling tubes 3. The height differential between the fluidized catalyst bed level and the upper level of the cooling tubes has been indicated as H which I will define more specifically hereinbelow. Reactor 2 may be provided with suitable means for the introduction of new catalyst and for the withdrawal of used catalyst, either continuously or at suitable intervals, as desired.

The hydrogen and carbon monoxide react exothermically in reactor 2, but by using cooling tubes 3 the temperature in the zone of the reactor containing this cooling means is readily maintainable between 290 to 340° C. which is the desirable temperature range for my preferred catalyst. In the zone of the catalyst bed above the cooling tubes is present products of the synthesis reaction, unreacted carbon monoxide and hydrogen and catalyst. The actual and relative amounts of these materials is dependent upon the actual value of H, but I have found that the hydrogen content may be as high as 40 volume per cent and higher and the carbon monoxide content may be as high as 10 volume per cent, though usually less. In this zone the cooling tubes 3 effect substantially no cooling and the hydrogen and carbon monoxide continue to react exothermically, but, since no means is provided for removing the excess heat, the temperature in this zone rises to a point above the reaction temperature that is maintained in the lower portion of the reactor. The temperature in the catalyst bed above the cooling tubes may rise to a point within the range of 300 to 500° C., and, as indicated above, the gases within this zone of the catalyst bed are hydrogen-rich. These conditions are conducive for the regeneration of the catalyst in the zone above the cooling tubes, and the catalyst is regenerated there. I prefer to carry out my process under conditions such that the temperature of the zone above the cooling tubes is within the range of 350 to 450° C., but higher and lower temperatures are obtainable.

The temperatures that I use in the regeneration zone are also favorable for the formation of carbon from carbon monoxide, and, due to the presence of carbon monoxide in this zone, it may be expected that some carbon formation will occur. Actually the concentration of carbon monoxide is so low and the ratio of hydrogen to carbon monoxide is sufficiently high in this zone that carbon formation is not only minimized but regeneration of the catalyst is effected as the principal reaction.

The effluent from reactor 2 leaves via line 5 containing condenser 6 to separator 7. The effluent from reactor 2 contains hydrocarbons of varying molecular weight and varying carbon content and oxygenated organic compounds, such as alcohols, acids, aldehydes and ketones, in addition to unreacted hydrogen and carbon monoxide and inert gases, such as carbon dioxide and steam. From separator 7 the liquid products or those products having at least three carbon atoms per molecule are withdrawn via line 8, and the gaseous products are withdrawn via line 9. These gases may be vented from the system, as indicated, but it has been found that it is advantageous to recycle at least a portion of these gases to the synthesis reactor where they serve as a diluent for the fresh feed gases, as a means for aiding the fluidization of the catalyst and as a means for aiding temperature control. I prefer to recycle at least a portion of these gases via line 10 to reactor 2 with the incoming fresh feed.

Since the effluent from reactor 2 may have some entrained catalyst, it is usually advisable to provide the reactor, at or near the top, with some means for separating the entrained catalyst particles, such as a cyclone separator, a fine mesh screen, etc.

The turbulent condition and constant agitation of the catalyst will cause a constant interchange of catalyst particles between the synthesis reaction zone and the catalyst regeneration zone in my reactor. If the movement of the catalyst makes difficult the maintenance of the desired temperature levels in the synthesis and regeneration zones, the difficulty can be overcome by elongating the reaction chamber and decreasing its internal diameter. Then, the rate of interchange of catalyst particles between the two zones will be decreased, and it will be possible to maintain the desired temperatures.

The actual value of H or distance between the fluidized catalyst level and the top of the cooling tubes is not only variable but also dependent upon variable factors. Among such variable factors are the reactor design, the synthesis and regeneration temperatures, the amount of catalyst to be regenerated, the type and age of the catalyst, etc. More specifically, I have found that the actual value of H is such that the volume of the catalyst regeneration zone is from 5 to 50 per cent of the overall volume of the entire fluidized catalyst bed. This value may also be more accurately expressed in terms of the ratio of the volume of catalyst bed in the synthesis zone to that within the regeneration zone. These ratios will fall within the range of 19:1 to 1:1, and more preferably within the range of 10:1 to 3:1.

From the foregoing description the utility and highly advantageous nature of my invention is readily apparent, and other embodiments or modifications of my invention may be devised from my description. For example, if there is insufficient carbon monoxide in the regeneration zone to provide the desired regeneration temperature, fresh synthesis gas, sufficient to provide the desired temperature, may be introduced intermittently or continuously to the reactor in the regeneration zone via line 11. Also, if it is found that the regeneration of the catalyst is inadequate, it is advisable to introduce, intermittently or continuously, hydrogen or a hydrogen-rich gas, such as a portion of the tail gas that was indicated above as being vented from the system, to the catalyst regeneration zone to aid the regeneration. The introduction of tail gas to the catalyst regeneration zone may be accomplished, as shown on the drawing, via line 12. In one modification, smooth operation may be maintained by alternating the injection of synthesis gas through line 11 with the introduction of hydrogen-rich gas through line 12, each for such a period of time that the temperature in the regeneration zone is maintained within the desired range previously disclosed. Also, the reactor may be compartmented by various schemes in order to aid in the maintenance of part of the catalyst at higher than the normal reaction temperatures in the presence of hydrogen-rich gases. Such compartmenting may be accomplished, if desired, by the use of baffles or a perforated, metallic, separating plate near the bottom of the catalyst regeneration zone. The above examples illustrate some of the many modifications of my invention that will be apparent to one skilled in the art and which are within the scope of my invention.

I claim:

1. The method of effecting a catalytic synthesis reaction for the production of organic compounds which comprises passing a gaseous mixture of hydrogen and carbon monoxide upwardly through a single agitated dense turbulent fluidized bed of finely divided catalyst for the reaction having an observable upper level, at an elevated pressure and at catalyst-fluidizing conditions in a single vertical reaction chamber of sufficient elongation that two zones of differing temperature conditions can be maintained in said single turbulent bed of fluidized catalyst, maintaining the temperature within a lower zone of the fluidized catalyst bed adjacent to the point of introduction of said gaseous mixture to said catalyst bed within a range suitable for the synthesis reaction, and maintaining the temperature of the remaining upper zone of the fluidized catalyst bed at a higher value and within a range suitable for the regeneration of said catalyst, the agitation and turbulence of said fluidized bed causing a constant interchange of catalyst particles between said lower synthesis zone and said upper regeneration zone of the bed whereby the synthesis reaction and the regeneration of the catalyst are effected simultaneously in the same single fluidized bed in said reaction chamber.

2. The method according to claim 1 wherein the volume of the upper catalyst regeneration zone is from 5 to 50 per cent of the total fluidized catalyst bed volume.

3. The method of effecting a catalytic synthesis reaction for the production of hydrocarbons and oxygenated organic compounds which comprises passing a gaseous mixture of hydrogen and carbon monoxide in the molal ratio of 1:1 to 3:1 upwardly through a single agitated dense turbulent fluidized bed of finely divided catalyst for the reaction having an observable upper level, at an elevated pressure and at catalyst-fluidizing conditions in a single vertical reaction chamber of sufficient elongation that two zones of differing temperature conditions can be maintained in said single turbulent bed of fluidized catalyst, maintaining the temperature within a zone comprising at least the lower one-half of the fluidized catalyst bed adjacent to the point of introduction of said gaseous mixture to said catalyst bed within a range suitable for the synthesis reaction, and maintaining the temperature of the remaining upper zone of the fluidized catalyst bed at a higher value and within a range suitable for the regeneration of said catalyst, the agitation and turbulence of said fluidized bed causing a constant interchange of catalyst particles between said lower synthesis zone and said upper regeneration zone of the bed whereby the synthesis reaction and the regeneration of the catalyst are effected simultaneously in the same single fluidized bed in said reaction chamber.

4. A method according to claim 3 wherein the catalyst is a reduced iron oxide catalyst promoted with minor proportions of oxides of aluminum, potassium and calcium.

5. A method according to claim 4 wherein the temperature for the synthesis reaction is from 290 to 340° C. and the temperature in the regeneration zone is from 300 to 500° C.

6. A method according to claim 3 wherein the temperature for regenerating the catalyst in the portion of the fluidized catalyst bed wherein the catalyst is regenerated is maintained by the hydrogenation of carbon monoxide in said portion of the catalyst bed.

7. A method according to claim 3 wherein the temperature for regenerating the catalyst in the portion of the fluidized catalyst bed wherein the catalyst is regenerated is maintained by introducing a gaseous mixture of hydrogen and carbon monoxide in addition to any unreacted carbon monoxide and hydrogen from the synthesis reaction zone into said portion of the catalyst bed.

8. The method of effecting a catalytic synthesis reaction for the production of hydrocarbons and oxygenated organic compounds which comprises passing a gaseous mixture of hydrogen and carbon monoxide in the molal ratio of 1.8:1 to 2.2:1 upwardly through a single agitated dense turbulent fluidized bed of finely divided catalyst for the reaction having an observable upper level, at an elevated pressure and at catalyst-fluidizing conditions in a single vertical reaction chamber of sufficient elongation that two zones of differing temperature conditions can be maintained in said single turbulent bed of fluidized catalyst, maintaining the temperature within a zone comprising at least the lower one-half of the fluidized catalyst bed adjacent to the point of introduction of said gaseous mixture to said catalyst bed within a range suitable for the synthesis reaction, introducing a portion of said gaseous mixture of hydrogen and carbon monoxide to the remaining upper zone of the fluidized catalyst bed in a quantity sufficient to maintain the temperature in said upper zone of the fluidized catalyst bed higher than in said lower zone and within a range suitable for the regeneration of said catalyst, withdrawing reaction products from above the upper level of said fluidized catalyst bed, separating from said products those products containing more than three carbon atoms per molecule, recycling a portion of those reaction products containing no more than three carbon atoms per molecule to said lower zone of the fluidized catalyst bed wherein a temperature suitable for the synthesis reaction is maintained, and introducing another portion of said reaction products having no more than three carbon atoms per molecule as a hydrogen-rich gas to said upper zone of the fluidized catalyst bed wherein a temperature suitable for regenerating the catalyst is maintained to increase the hydrogen concentration therein, the agitation and turbulence of said fluidized bed causing a constant interchange of catalyst particles between said lower synthesis zone and said upper regeneration zone of the bed whereby the synthesis reaction and the regeneration of the catalyst are effected simultaneously in the same single fluidized bed in said reaction chamber.

WILLIAM C. LANNING.

REFERENCES CITED

The following references are of record in the file of this patent:

UNITED STATES PATENTS

| Number | Name | Date |
| --- | --- | --- |
| 2,347,682 | Gunness | May 2, 1944 |
| 2,373,008 | Becker | Apr. 3, 1945 |
| 2,434,537 | Barr et al. | Jan. 13, 1948 |
| 2,446,426 | Layng | Aug. 3, 1948 |
| 2,463,912 | Scharmann | Mar. 8, 1949 |
| 2,464,505 | Hemminger | Mar. 15, 1949 |
| 2,481,089 | Dickinson | Sept. 6, 1949 |